(12) United States Patent
Cloutier et al.

(10) Patent No.: US 10,201,780 B2
(45) Date of Patent: Feb. 12, 2019

(54) METHOD AND DEVICE FOR IMPROVING THE CAPTURE OF SULFUR DIOXIDE FROM THE GASES OF ELECTROLYSIS TANKS BY A SET OF FILTERING MODULES

(71) Applicant: FIVES SOLIOS, Le Pecq (FR)

(72) Inventors: Bernard Cloutier, Saint Germain en Laye (FR); El Hani Bouhabila, Saint Germain en Laye (FR); Alix Rocle, Saint Germain en Laye (FR)

(73) Assignee: FIVES SOLIOS, Le Pecq (FR)

( * ) Notice: Subject to any disclaimer, the term of this patent is extended or adjusted under 35 U.S.C. 154(b) by 0 days.

(21) Appl. No.: 15/550,617

(22) PCT Filed: Jan. 25, 2016

(86) PCT No.: PCT/FR2016/050141
§ 371 (c)(1),
(2) Date: Aug. 11, 2017

(87) PCT Pub. No.: WO2016/128635
PCT Pub. Date: Aug. 18, 2016

(65) Prior Publication Data
US 2018/0036678 A1 Feb. 8, 2018

(30) Foreign Application Priority Data
Feb. 13, 2015 (FR) ...................................... 15 51202

(51) Int. Cl.
*B01D 53/50* (2006.01)
*B01D 53/74* (2006.01)

(52) U.S. Cl.
CPC ...... *B01D 53/508* (2013.01); *B01D 2253/104* (2013.01); *B01D 2257/2047* (2013.01)

(58) Field of Classification Search
CPC .. C25C 3/22; B01D 53/508; B01D 2253/104; B01D 53/50; B01D 53/685; B01D 53/81;
(Continued)

(56) References Cited

U.S. PATENT DOCUMENTS 3,664,935 A * 5/1972 Johnson .................... C25C 3/06
204/245
3,790,143 A * 2/1974 Nix ......................... B01D 45/12
266/157

(Continued)

FOREIGN PATENT DOCUMENTS

CN 107208290 A * 9/2017 ............... C25C 3/22
EP 0 793 527 B1 4/2001
(Continued)

OTHER PUBLICATIONS

International Search Report, dated Apr. 28, 2016, from corresponding PCT application No. PCT/FR2016/050141.

*Primary Examiner* — Timothy C Vanoy
(74) *Attorney, Agent, or Firm* — Young & Thompson

(57) ABSTRACT

Disclosed is a method and a device for capturing the $SO_2$ present in gases by igneous electrolysis implemented on a group of at least two filtering modules traversed in parallel by the gas flow to be purified, and supplied with a powder material sorbent capable of adsorbing effluents in the gas flow by bringing the sorbent into contact with the gas flow, each filtering module having a unit for collecting the sorbent after it has been brought into contact with the gas flow, in the filtering module, and a unit for discharging the sorbent collected being contact with the gas flow to a unit for injecting same into at least one other of the filtering modules of the at least one series, except for the last filtering module of each series, and, on exiting the last filtering module or modules, the gas flow is sent to a desulfurization unit.

9 Claims, 4 Drawing Sheets

(58) Field of Classification Search
CPC .............. B01D 53/869; B01D 53/8693; B01D 2257/2047; B01D 2257/302; B01D 2267/00; B01D 46/0019; C01F 7/02
See application file for complete search history.

(56) References Cited

U.S. PATENT DOCUMENTS

| | | | | |
|---|---|---|---|---|
| 3,876,394 | A * | 4/1975 | Nix | B01D 45/12 423/240 R |
| 5,885,539 | A | 3/1999 | Bjarno et al. | |
| 9,242,203 | B2 * | 1/2016 | Bjarno | B01D 53/10 |
| 2009/0068077 | A1 | 3/2009 | Cloutier et al. | |
| 2013/0048508 | A1 | 2/2013 | Wedde | |
| 2013/0333565 | A1 * | 12/2013 | Bjarno | B01D 53/10 95/92 |
| 2014/0283687 | A1 | 9/2014 | Bouhabila et al. | |
| 2016/0101384 | A1 * | 4/2016 | Bjarno | B01D 53/10 423/240 S |

FOREIGN PATENT DOCUMENTS

| | | | | |
|---|---|---|---|---|
| EP | 2 360 296 A1 | 8/2011 | | |
| FR | 2 984 366 A1 | 6/2013 | | |
| GB | 1396597 A * | 6/1975 | ............. | B01D 53/46 |
| WO | 96/15846 A1 | 5/1996 | | |
| WO | 2007/096492 A1 | 8/2007 | | |
| WO | WO 2016 092357 A1 * | 6/2016 | ............... | C25C 3/22 |

* cited by examiner

METHOD AND DEVICE FOR IMPROVING THE CAPTURE OF SULFUR DIOXIDE FROM THE GASES OF ELECTROLYSIS TANKS BY A SET OF FILTERING MODULES

The present invention relates to a process and a device for capturing sulphur dioxide ($SO_2$) present in the gases which originate from tanks for the industrial production of aluminium by fused-salt electrolysis. This process is implemented in a gas treatment centre comprising at least two filtering modules, passed through in parallel by a gas stream to be purified, each module comprising a gas flow reactor followed by a filtering means. The reactors are fed, at least partially in at least one series or cascade, with a sorption agent of the pulverulent material type, in particular alumina particles, capable of adsorbing effluents present in the gas stream by bringing the sorption agent into contact with the gas stream.

The use of alumina particles in gas treatment reactors to adsorb hydrofluoric acid (HF) present in the gases originating from the cells for the industrial production of aluminium by fused-salt electrolysis is a well-known and efficient technology. It is also known that this alumina, with its large adsorption surface area (up to 82 $m^2/g$), can also, under certain conditions, adsorb the $SO_2$ also present in the cell gases.

Although the alumina adsorbs $SO_2$ very easily, the capture of the $SO_2$ present in the gases originating from the electrolytic cells is not easy because the alumina adsorbs HF preferentially relative to $SO_2$. In the case where HF and $SO_2$ are present in the gases to be treated, in order to be able to capture the $SO_2$, it is necessary to use a sufficient quantity of alumina, so that the latter is not saturated after adsorbing the HF. In the case in which the alumina is saturated with $SO_2$ following treatment of a gas containing no HF, this $SO_2$ would be desorbed if the alumina were brought into contact with a gas containing HF, the HF taking the place of the $SO_2$ on the alumina particles. In an aluminium plant, the quantity of alumina available is limited.

The patent EP 0 793 527 proposes to use two stages of treatment in series of the gas stream to be purified in one and the same filtering module so as to capture the HF then the $SO_2$ successively. The gases to be treated loaded with HF and $SO_2$ pass through a first stage comprising the reactor where they encounter regenerated alumina. On leaving this reactor, the HF is completely adsorbed on the alumina. The gases are then directed to a device for mechanically separating the fluorinated alumina from the gases. On leaving this first stage, the gases are thus purified of HF. They are then directed to the second stage, the filter, where fresh alumina is injected for capturing the $SO_2$. The alumina loaded with $SO_2$ is finally directed to a desorber where the $SO_2$ is extracted from the alumina. The alumina thus regenerated is returned, countercurrently with respect to the direction of circulation of the gas stream, into the first treatment stage and the concentrated $SO_2$ is sent into a reclamation system. This solution is not completely satisfactory because it requires a bulky and costly device for separating the fluorinated alumina in the first stage of treatment.

In order to overcome these drawbacks, FR 2 984 366 proposes a process for the adsorption of $SO_2$ applied to modules placed in a cascade (as defined by the applicant's patent WO2007096492), i.e. over a group of at least two filtering modules fed on the one hand in parallel with gas to be treated and on the other hand in at least one series with sorption agent and/or chemical neutralization agent of the pulverulent material type capable of adsorbing effluents present in said gas stream.

In this process, the sorption agent, which is alumina is overfed into the first reactors or upstream reactors of the cascade filters. This overfeeding, which reduces the concentration of the HF captured on the alumina then makes it possible to absorb the $SO_2$. The alumina which circulates in a cascade from one module to the next, from the module at the upstream end to the module at the downstream end of the cascade, is progressively loaded with HF, thus reducing its capacity to capture the $SO_2$ in the downstream module(s), up to the point where the $SO_2$ is no longer captured and is desorbed on contact with the fluorinated gases from the final modules in the cascade. This configuration makes it possible to exploit the ability of the fresh alumina to adsorb the $SO_2$ by using it in particular in the first modules or upstream modules, i.e. in the modules for which the quantity of fluorine taken up by the alumina is not yet sufficient to impede the adsorption of the $SO_2$, in the final modules or downstream modules of the cascade, on the contrary, the presence of fluorine little by little limits, then nullifies the $SO_2$ adsorption capacity of the alumina.

Thus, it can be seen that FR 2 984 366 proposes an $SO_2$ treatment that is particularly effective over the first module(s) of a cascade in which the alumina injected and filtered is least loaded with HF.

The present invention proposes a treatment targeted on the final module(s) of at least one series of modules of a gas treatment centre, configured in a cascade according to WO 2007096492, which makes it possible to obtain a targeted $SO_2$ capture efficiency over the final modules, for limited investment and operating costs.

Advantageously, the present invention can be implemented in combination with the solution according to FR 2 984 366 over the first modules in order to obtain an increased overall efficiency. It can also be implemented independently, when the yield required with respect to the $SO_2$ remains limited.

According to a first aspect, the invention consists of a process for capturing the $SO_2$ present in gases to be purified, which originate from cells for the industrial production of aluminium by fused-salt electrolysis, implemented over a group of at least two filtering modules passed through in parallel by a stream of said gases to be purified, said filtering modules being fed from a storage means, at least partially in at least one series or cascade, with a sorption agent of the pulverulent material type, capable of adsorbing effluents present in the gas stream by bringing the sorption agent into contact with the gas stream, each filtering module of the group having means for collecting said sorption agent after it is brought into contact with said gas stream in said filtering module, and having means for discharging said sorption agent collected after said bringing into contact with said gas stream towards means for injection into at least one other of said filtering modules of said at least one series, except for the final filtering module of each series, in the order of feeding of the filtering modules with sorption agent from the storage means, characterized in that the gas stream fraction leaving at least the final filtering module(s) of each series is directed to a desulphurization unit.

By this process, the efficiency of the $SO_2$ capture is greatly increased.

The sorption agent is advantageously alumina $Al_2O_3$.

The desulphurization unit can operate according to a dry process, an activated dry process, a semi-wet process, or a washing.

Advantageously, a part of the sorption agent discharged by at least the penultimate filtering module of at least one series of filtering modules is diverted to an outlet pipe, whilst another part of said discharged sorption agent feeds the final filtering module of said at least one series of filtering modules, so as to saturate the sorption agent with fluorine in said final filtering module or to cause it to reach a level close to its saturation, and to force the release of $SO_2$, previously adsorbed on said sorption agent into the fraction of the gas stream leaving said final filtering module and directed to said desulphurization unit.

The sorption agent collected, after passing through at least one of the filtering modules of the group, is discharged and directed directly to the means for injecting at least one other of the filtering modules of said group, without an intermediate $SO_2$ desorption stage.

Thus, the number of stages of the process and the number of items of equipment is reduced, so that the costs are reduced.

Advantageously, the fraction of said gas stream leaving at least the first filtering module, in the order of feeding the filtering modules of each series of the group with sorption agent, is directed to an exhaust stack without passing through a desulphurization unit.

According to a second aspect, the invention relates to a device for capturing the $SO_2$ present in gases to be purified, which originate from cells for the industrial production of aluminium by fused-salt electrolysis, utilized over a group of at least two filtering modules passed through in parallel by a stream of said gases to be purified, said filtering modules being fed, at least partially in at least one series or cascade, with a sorption agent of the pulverulent material type, capable of adsorbing effluents present in the gas stream by bringing the sorption agent into contact with the gas stream, each filtering module having means for collecting said sorption agent after it is brought into contact with said gas stream in said filtering module, and having means for discharging said sorption agent collected after said bringing into contact with said gas stream towards means for injection into at least one other of said reactors of the group, characterized in that it comprises a unit for desulphurization of the gas stream fraction leaving at least the final filtering module(s) in the order of feeding the group of filtering modules with sorption agent from a storage means of said sorption agent.

Advantageously, in order to improve the $SO_2$ recovery yield, an outlet pipe is placed on the penultimate filtering module(s) of a group of filtering modules in order to discharge a part of the sorption agent originating from said penultimate filtering module(s), so as to saturate the sorption agent with fluorine in the final filtering module(s) or cause it to reach a level close to its saturation.

The device preferably has no means for desorption of the $SO_2$ between the means for discharge from at least one of said filtering modules of the group and the means for injecting the next filtering module in the order of feeding the group of filtering modules with sorption agent from said storage means.

The location of the desulphurization system at the end of the gas treatment centre makes it possible to obtain greater efficiency compared with this same desulphurization system located at any other location in the installation. In fact, due to the ability of the fluorine to displace the previously adsorbed $SO_2$ from the alumina to the fumes, the fumes having passed through the final module(s) of the cascade, or each cascade, are naturally more loaded with $SO_2$. They can even have a higher $SO_2$ concentration than those of the fumes entering the treatment centre. They are thus, so to speak, enriched with $SO_2$ by the phenomenon of release of the $SO_2$ by the alumina in the presence of HF fluorine into the fumes.

This phenomenon of release of the $SO_2$ by the alumina is directly linked to the increase in the quantity of fluorine adsorbed on the alumina as it passes through the modules of the cascade in series. The more the alumina is enriched with fluorine, the less able it is to capture the $SO_2$ up to the point where the fluorine concentration displaces the $SO_2$ which is then released into the fumes. It is then no longer desirable to consider the fumes leaving each of the modules as identical, although each module is fed by a gas stream fraction that is identical in nature (concentration of pollutants). This differentiation of the fractions of outgoing streams and the implementation of the invention is thus specific to the installation of reactors in cascade according to the applicant's patent WO 2007096492 and does not relate to the standard installations where each filter receives an equivalent quantity of fresh alumina which is fed to the reactors in parallel.

The process of the present invention is therefore based on the ability of the alumina to capture $SO_2$ when the concentration of gaseous fluorine on the alumina is low, as well as on its ability to release it when the concentration of gaseous fluorine on this alumina exceeds a certain threshold, without using this same alumina as an $SO_2$ sorption agent. It is paradoxical that the alumina is not the $SO_2$ sorption agent even though it plays an essential role in the implementation of the invention. In reality this process indirectly uses the potential of the alumina to capture $SO_2$: it uses it not only to adsorb the $SO_2$ in the first modules but also to release it from the final module(s) which is (are) then specifically treated by a standard route, for example of the activated dry type or wet washer. Advantageously, the potential of the alumina is used to concentrate the pollutant on the final filtering module, or on the final modules, downstream of the cascade. With this concentration of the fumes, the targeted application of the desulphurization system implemented according to the invention makes it possible to obtain a reduction of 20 to 50% depending on the case, for a limited investment cost.

Furthermore, the gas stream fraction leaving the first filtering module(s), or filtering modules upstream of the installation, is directed to an exhaust stack, without passing through a desulphurization unit, which helps to limit the investment.

Variants

According to a first embodiment variant of the invention, the alumina is enriched with fluorine in the final module of the cascade—that from which the outgoing gases are treated by a desulphurization system—by reducing the flow of alumina injected into this final module. For example, a part of the alumina discharge flow from the penultimate module is diverted to the discharge system, by-passing the final module. Thus, as the alumina is in a smaller quantity relative to the presence of more fluorine in the final module, the phenomenon of preferential adsorption of the HF leads to increased release of $SO_2$ by the alumina in this module. It should be noted that it is not desirable to go as far as saturating the alumina to the detriment of the capture of the fluorine itself. However, any excess gaseous fluorine not adsorbed by the alumina—should it reach the state of saturation with HF—can be treated at the same time as the $SO_2$ by the desulphurization system located downstream of the final module, as it is capable of stopping small quantities of residual gaseous fluorine.

According to another embodiment variant of the invention, the gases originating from the penultimate module, or also from "n" modules situated upstream of the final module of the cascade, i.e. situated towards the downstream end of the cascade, are also sent to the desulphurization system, in addition to the gases originating from the final module. In this variant, the phenomenon of release is exploited as soon as it occurs, or a few modules after it occurs, i.e. before reaching its maximum level in the final module. This variant makes it possible to increase the efficiency of the $SO_2$ capture. The number of downstream modules to be linked to a desulphurization systems depends on the size of the installation, the characteristics of the fumes to be treated, and on the $SO_2$ capture yield desired by the client. The number of downstream modules from which the outgoing gases are directed to the desulphurization system advantageously remains less than half of the total number of filtering modules, as the total quantity of HF fluorine adsorbed by the alumina over the first half, or upstream half of a cascade is too low to obtain a useable release of $SO_2$. In fact the alumina, far from being saturated, still has some margin for capturing both HF and $SO_2$, and the latter therefore remains largely adsorbed on the pulverulent material.

Finally, other variants of the invention consist of combining the two variants previously described above.

EMBODIMENT EXAMPLES OF THE INVENTION

According to a first, purely illustrative embodiment example of the invention, the gas treatment centre comprises a cascade of five filtering modules each comprising a reactor and a filter. With regard to the sorption agent, the reactor of the first module is fed only with fresh alumina originating from a silo of alumina and bringing it into contact with the fraction of the gas stream passing through this first reactor upstream of the cascade. The filtered and collected alumina originating from the filter of the first module is then channelled in its entirety to the means for injecting the reactor of a second module, which is adjacent thereto in the downstream direction of the cascade. The second reactor therefore receives alumina that has already been brought into contact with fluorine in the $1^{st}$ reactor. The reactor of the second module is also fed with fresh alumina originating from the silo of alumina, in proportions of 25% fresh alumina and 75% alumina originating from the first module. The second filter participates in collecting this alumina which is discharged into the means for injecting a third module which is adjacent thereto, downstream. This third module therefore receives alumina that has already been brought into contact with fluorine in the $1^{st}$ and $2^{nd}$ reactors. This third module receives no fresh alumina originating from the storage means but 100% alumina originating from the second module. The third filter collects this alumina which is discharged into the means for injecting a fourth module which is adjacent thereto, downstream. This fourth module thus receives alumina that has already been brought into contact with fluorine in the $1^{st}$, $2^{nd}$ and $3^{rd}$ reactors. The fourth module discharges this alumina into the means for injecting the final module which is adjacent thereto in the downstream direction. This final module therefore receives alumina that has already been brought into contact with fluorine in all the reactors upstream. The quantity of fluorine adsorbed on this alumina is therefore maximal. Faced with the inflow of fluorine, the filter of the fifth module is favourable to the phenomenon of $SO_2$ release. The fumes leaving the $5^{th}$ and final filtering module are more loaded with $SO_2$ than the gases entering therein. Conversely, the alumina discharged by the 5th and final module is depleted of $SO_2$ relative to that leaving the preceding module. This $SO_2$ naturally passes from the alumina towards the fumes. The fumes are then directly conveyed to a small-sized desulphurization system, dimensioned for the treatment of only ⅕ of the entire flow of fumes treated by the gas treatment centre, but with a high $SO_2$ concentration.

With a single desulphurization system positioned at the outlet of the $5^{th}$ module, the $SO_2$ capture efficiency of the final module is more than 95% and the overall efficiency of the treatment centre (5 modules) is approximately a 20 to 30% reduction in the $SO_2$. This efficiency can seem limited but it is in fact significant in view of the extremely reduced means used for implementation.

According to a second embodiment example of the invention, by also linking the outlet of the fourth module to the desulphurization system, dimensioned for the treatment of ⅖ of the flow of the gas treatment centre, and with the same yield of the desulphurization installation itself vis-à-vis the flow passing through it, the overall efficiency of the 5-module centre is approximately a 40 to 50% reduction in the $SO_2$. The efficiency obtained is significant in view of its investment cost.

It is obvious that the advantage of the invention is being able to obtain a significant $SO_2$ capture efficiency of approximately 20% to 50% with a desulphurization installation which is of limited size because it deals with a fairly low flow of fumes.

The first embodiment example of the invention with five filtering modules can also be re-arranged as a two-cascade centre, the first with three modules in series and the second with two filtering modules in series, in which case the fumes originating from the $3^{rd}$ and $5^{th}$ modules, or the final modules of each of the cascades respectively, are directed to the same desulphurization system. In this case, the cascade constituted by only two modules is, for example, fed with fresh alumina to its $1^{st}$ module only. The cascade constituted by three modules is, for example, fed with fresh alumina divided into 80% at the first module, 20% at the second module, and 0% at the third and final module, this final module being linked to the desulphurization system.

The present invention is now described in more detail with reference to examples which are purely illustrative and in no way limitative of the scope of the invention, and the following illustrations in which.

Figure 1:
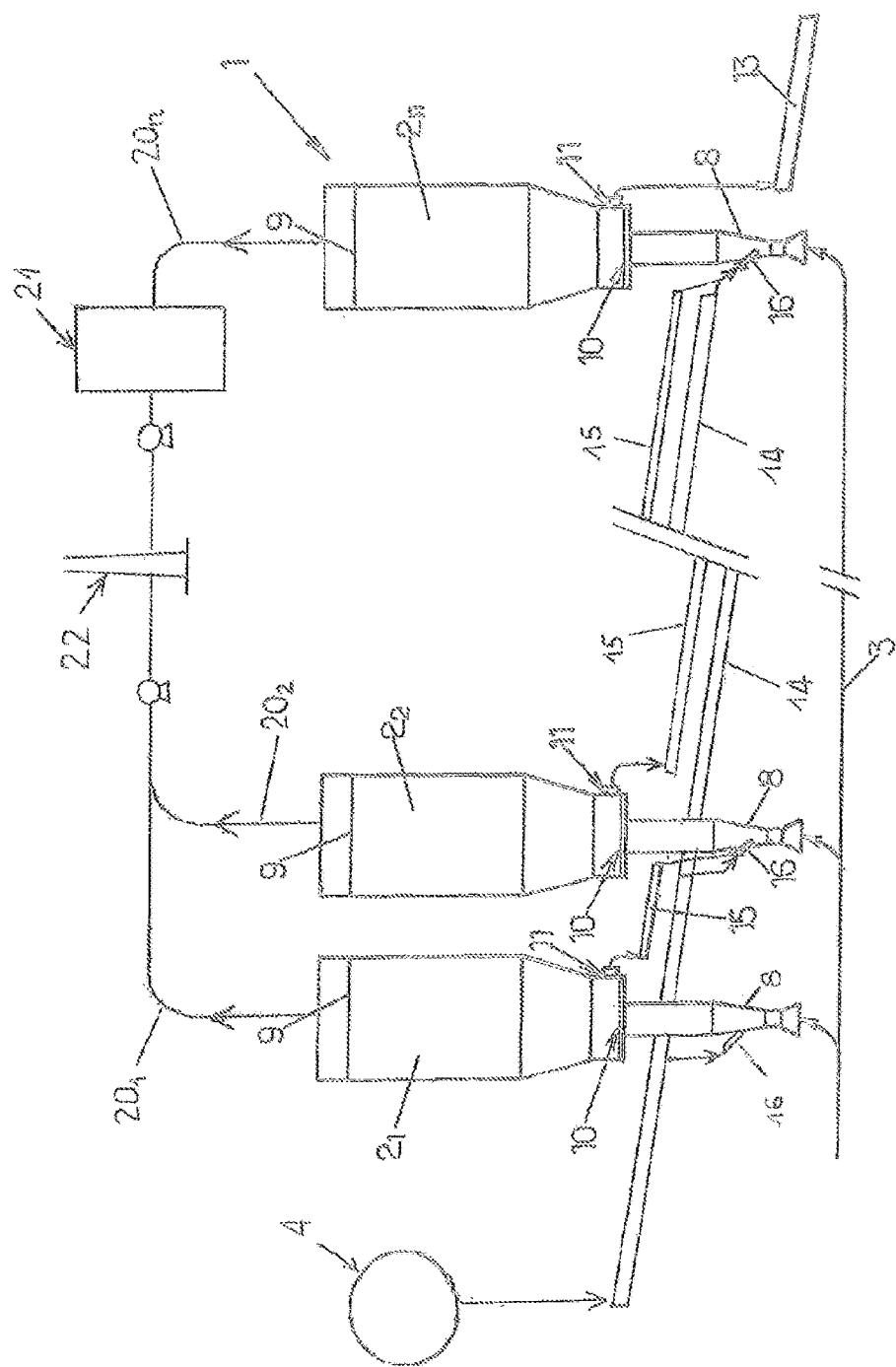
FIG. 1 is a diagrammatic representation of a gas treatment centre according to a first embodiment example of the invention.

As shown in FIG. 1, the invention relates to a gas treatment centre 1 comprising n filtering modules numbered $2_1$ to $2_n$.

The gas stream to be treated is distributed by a pipe 3 in parallel with the reactors 8 of the n filtering modules. The fractions of the gas stream originating from the modules n leave via pipes $20_1$ to $20_n$ and join at a stack 22 of the gas treatment centre 1. The fractions of the stream conveyed by the pipes $20_i$ are loaded with an $SO_2$ concentration which increases with i; for example the gas stream conveyed by $20_n$ is more loaded with $SO_2$ than the flow conveyed by $20_{n-1}$ which is itself more loaded than the flow conveyed by $20_{n-2}$, etc.

The reactor 8 of the first module $2_1$ or upstream module is fed only with fresh alumina up to its injection means 16, via a transport pipe 14 fed by a storage means 4 of fresh alumina. After leaving the 1$^{st}$ filtering module $2_1$ via collection 10 and discharge 11 means of the module $2_1$, the alumina is discharged into a pipe 15 which joins an injection means 16 of the reactor 8 of the second module $2_2$, which can also be fed with fresh alumina via the pipe 14, in a smaller quantity than the upstream module $2_1$, and so on up to the final module $2_n$1. The sorption agent, which is alumina, is discharged, into the outlet of the final module $2_n$ or downstream module to an outlet pipe 13.

The first module $2_1$ feeds the second module $2_2$ with sorption agent so that the alumina injected into the module $2_1$ to be brought into contact there with the gas stream fraction which passes through this module $2_1$, then filtered and collected in this module $2_1$, originates from the module $2_1$ being already lightly loaded with fluorine and flows into the module $2_2$. The module $2_2$ is fed with sorption agent partially enriched with pollutant by the module $2_1$ but also with fresh sorption agent, of the fresh alumina type via the pipe 14. The proportion of alumina originating from the module $2_1$ and that originating from the pipe 14 depends on the requirements of the installation; this proportion can be adjusted differently for each module by appropriate means, each module $2_i$ remaining connected to the pipe 14; according to the principle of the invention, the flow of fresh alumina conveyed via the pipe 14 may be zero most of the time for the majority of the filtering modules, but can still be modified in specific cases.

After passing into the module $2_2$, this alumina is discharged via the discharge pipe 15 towards the next module and so on. The alumina discharged by the final module $2_n$ into the transport pipe 13 has therefore passed through all of the modules, through which it is successively enriched with fluorine. The module $2_n$ is the final module passed through by the alumina. The gas stream fraction leaving the final module $2_n$ via the pipe $20_n$ is directed to the desulphurization unit 21. On leaving the desulphurization unit 21, the gas stream treated (i.e. "Q/n" in the configuration of FIG. 1 with Q being the total flow of fumes treated in the centre 1) joins the remaining flow, i.e. "(n−1)*Q/n" at the stack 22, at which all the pipes $20_1$ to $20_{n-1}$ discharging the fractions of the gas stream passing through the filtering modules $2_1$ to $2_{n-1}$ end directly, without passing through the desulphurization unit 21.

Figure 2:
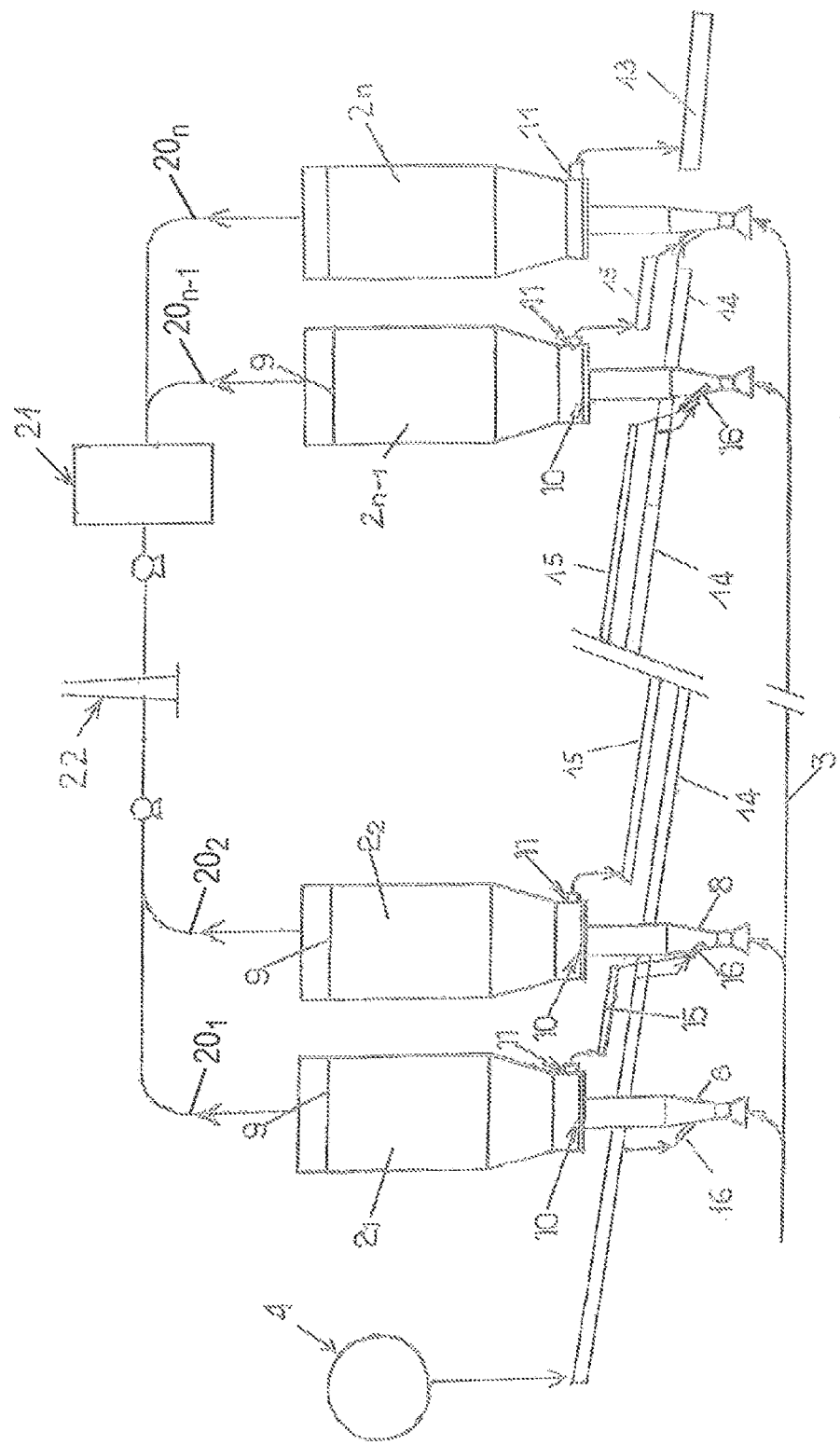
FIG. 2 is a representation similar to that of FIG. 1 in which both downstream filtering modules are linked to the desulphurization system, rather than just one.

FIG. 2 represents an embodiment variant in which the desulphurization unit 21 treats the fractions of the gas stream originating from several downstream modules instead of just the final module $2_n$. Here, the desulphurization unit 21 treats the fractions of the stream leaving the final module $2_n$ and the penultimate module $2_{n-1}$. The successive feeding with alumina of all of the modules remains unchanged relative to the solution represented in FIG. 1. The desulphurization unit 21, by contrast, treats a larger gas stream, corresponding to "2*Q/n" and this flow joins the flow "(n−2)*Q/n" at the stack 22, since the pipes $20_1$ to $20_{n-2}$ of all the modules except the last two are directly connected to this stack 22. This embodiment variant can have a larger number of modules connected to one or more desulphurization unit(s) 21.

The number of modules feeding the desulphurization unit 21 is advantageously less than "n/2" in order to retain the economic benefit of the invention. The number of desulphurization units 21 can be increased depending on the flow to be treated.

Figure 3:
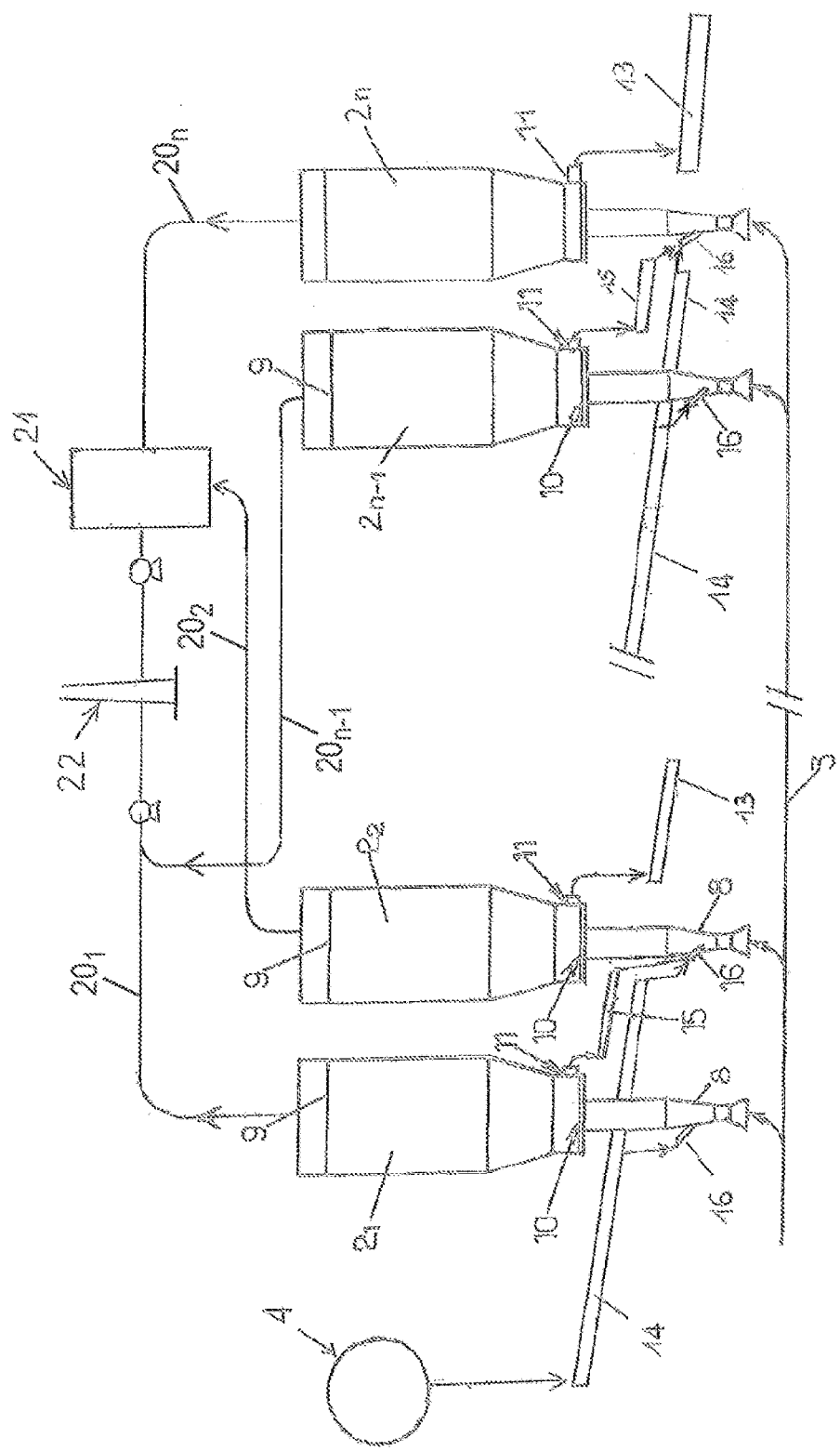
FIG. 3 is a representation similar to those of FIGS. 1 and 2 in which the gas treatment centre is composed of two cascades of filtering modules.

FIG. 3 represents another embodiment variant, close to that shown in FIG. 2, and in which the gas treatment centre 1 is a set of several cascades, two for example, constituted by 2 filtering modules each in series. The second module $2_2$ or $2_n$ of each cascade ($2_1$, $2_2$) or ($2_{n-1}$, $2_n$) is linked via the corresponding pipe $20_2$ or $20_n$ to the desulphurization unit 21, i.e. the fractions of the gas stream leaving the modules $2_2$ and $2_n$ are treated by the desulphurization system 21. The first module, or upstream module $2_1$ or $2_{n-1}$ of each cascade is fed only with fresh alumina via the transport pipe 14, from the storage means 4, and the second module $2_2$ or $2_n$ of each cascade is fed with both fresh alumina via the pipe 14 and with alumina collected in and originating from the first module $2_1$ or $2_{n-1}$, the alumina originating from each downstream module $2_2$ or $2_n$ being discharged via the pipe 13.

The discharge pipes $20_1$ and $20_{n-1}$ of the fractions of the gas stream passing through the upstream modules $2_1$ and $2_{n-1}$ of the cascades are linked directly to the stack 22 without passing through the desulphurization unit 21. No desulphurization unit is provided for treating the sorption agent loaded with effluents between the discharge means 11 of an upstream module and the injection means 16 of the adjacent downstream module.

This embodiment variant can have a greater number of cascades and of modules in series per cascade, for example 3, 4 or 5 filtering modules per cascade, the final module(s) of each cascade being linked to one or more desulphurization unit(s) such as 21.

Figure 4:
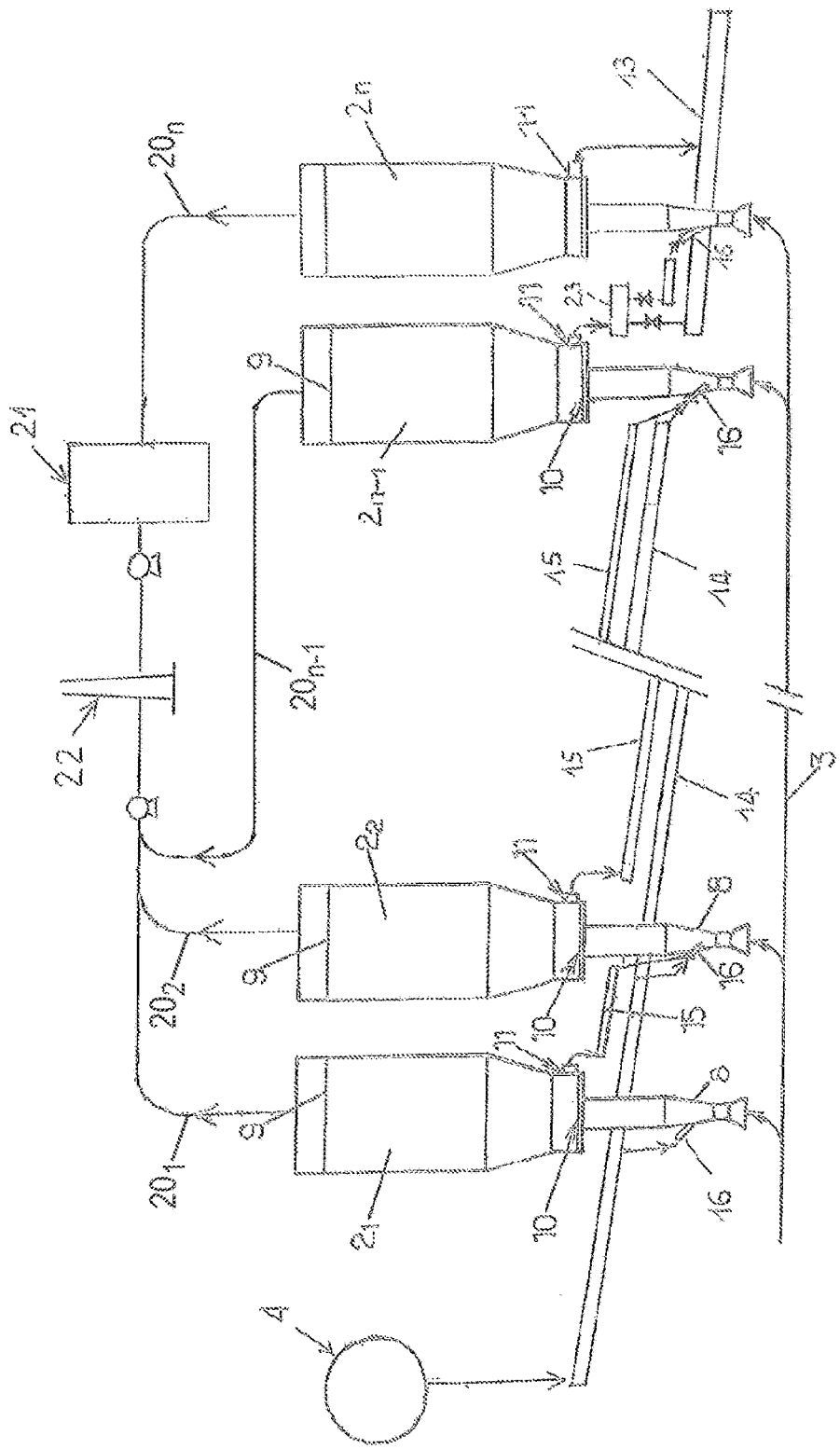
FIG. 4 is a representation similar to that of FIG. 1 for which the flow of sorption agent discharged from the penultimate module is not entirely directed to the final module, a part being able to be diverted to the outlet pipe, the final module not receiving any fresh sorption agent.

FIG. 4 shows an embodiment variant close to that of FIG. 1 and in which the flow of alumina discharged by the penultimate module $2_{n-1}$ is not all injected into the final module $2_n$. A part of this flow is diverted directly into the outlet pipe 13. A redirection unit 23 inserted between the alumina outlet of the module $2_{n-1}$ and the alumina inlet of the module $2_n$ enables this diversion. Such a box 23 can also be generally applied to all the modules linked to the desulphurization unit(s) 21 with a proportion of outflow to be established according to the requirements of the installation case by case. As explained above, the concentration of $SO_2$ in the fraction of the gas stream passing through the downstream module $2_n$ is increased by the forced release of the $SO_2$ due to the preferential adsorption of the HF by the smaller quantity of alumina loaded with effluents injected into the downstream module $2_n$. Therefore, in FIG. 4, the pipe $20_n$ discharging the fraction of the gas stream originating from the downstream filtering module $2_n$ is the only one to join the desulphurization unit 21, the other pipes $20_1$, $20_2$ and $20_{n-1}$ conveying all the fractions of the gas stream originating from the other modules $2_1$, $2_2$ and $2_{n-1}$ directly to the stack 22.

According to the invention, the desulphurization system can be, for example, based on a dry process, an activated dry process in which the adsorbing agent has been previously moistened, a semi-wet process with a limited injection of liquid, a wet process of the seawater-washing type, or any other washing.

According to the invention, it is then not necessary to desorb the $SO_2$ from the alumina after the alumina is brought into contact with the gas stream to be cleaned in each reactor, but the alumina is directly sent into the next reactor, without an intermediate stage of cleaning the $SO_2$, i.e. without desorption of the $SO_2$. Thus, the gas treatment centre 1 is simplified, in that it has no means of desorption of the $SO_2$ from the alumina between the reactors 8.

The invention claimed is:

1. A process for capturing the $SO_2$ present in gases to be purified, which originate from cells for an industrial production of aluminium by fused-salt electrolysis, implemented over a group of at least two filtering modules passed through in parallel by a stream of said gases to be purified, said filtering modules being fed from a storage means, at least partially in at least one series, with a sorption agent of a pulverulent material type, capable of adsorbing effluents present in said gas stream by bringing said sorption agent into contact with said gas stream, each filtering module of said group having means for collecting said sorption agent after bringing said sorption agent into contact with said gas stream in said filtering module, and having means for discharging said sorption agent collected after said bringing into contact with said gas stream towards means for injection into at least one other of said filtering modules of said at least one series, except for a final filtering module of each series, in an order of feeding of said filtering modules with sorption agent from said storage means, wherein a gas stream fraction leaving at least said final filtering module of each series is directed to a desulphurization unit,
wherein a fraction of said gas stream leaving at least a first filtering module, in the order of feeding with said sorption agent said filtering modules of each series of said group, is directed to an exhaust stack without passing through a desulphurization unit.

2. The process according to claim 1, wherein said sorption agent is alumina $Al_2O_3$.

3. The process according to claim 2, wherein said desulphurization unit operates according to one at least of a dry process, an activated dry process, a semi-wet process, and a washing.

4. The process according to claim 1, wherein said desulphurization unit operates according to one at least of a dry process, an activated dry process, a semi-wet process, and a washing.

5. The process according to claim 1 wherein a part of said sorption agent discharged by at least a penultimate filtering module of at least one series of filtering modules is diverted to an outlet pipe, while another part of said discharged sorption agent feeds a final filtering module of said at least one series of filtering modules, so as to saturate said sorption agent with fluorine in said final filtering module or to cause said sorption agent to reach a level close to saturation, and to force a release of $SO_2$, previously adsorbed on said sorption agent, into a fraction of said gas stream leaving said final filtering module and directed to said desulphurization unit.

6. The process according to claim 1, wherein collected sorption agent, after passing into at least one of said filtering modules of said group, is discharged and directed directly to said means of injection of at least one other of said filtering modules of said group, without an intermediate stage of desorption of $SO_2$.

7. A device for capturing $SO_2$ present in gases to be purified, which originate from cells for industrial production of aluminium by fused-salt electrolysis, implemented over a group of at least two filtering modules passed through in parallel by a stream of said gases to be purified, said filtering modules being fed, at least partially in at least one series, with a sorption agent of a pulverulent material type, capable of adsorbing effluents present in said gas stream by bringing said sorption agent into contact with said gas stream, each filtering module having means for collecting said sorption agent after bringing said sorption agent into contact with said gas stream in said filtering module, and having means for discharging said sorption agent collected after said bringing into contact with said gas stream towards means for injection into at least one other of said filtering modules of said group, the device comprising a desulphurization unit of a gas stream fraction leaving at least a final filtering module in the order of feeding said group of filtering modules with sorption agent from a storage means of said sorption agent, and
wherein at least a first filtering module, in the order of feeding with sorption agent said filtering modules of each series of said group a fraction of said gas stream leaving, is directly connected to an exhaust stack.

8. The device according to claim 7, wherein an outlet pipe is located on a penultimate filtering module of a group of filtering modules in order to discharge a part of said sorption agent originating from said penultimate filtering module, so as to saturate said sorption agent with fluorine in said final filtering module or cause said final filtering module to reach a level close to saturation.

9. The device according to claim 7, which is deprived of any means of desorption of $SO_2$ between said means for discharging at least one of said filtering modules of said group and said injection means of a next filtering module in an order of feeding said group of filtering modules with sorption agent from said storage means.

* * * * *